Figure 1:
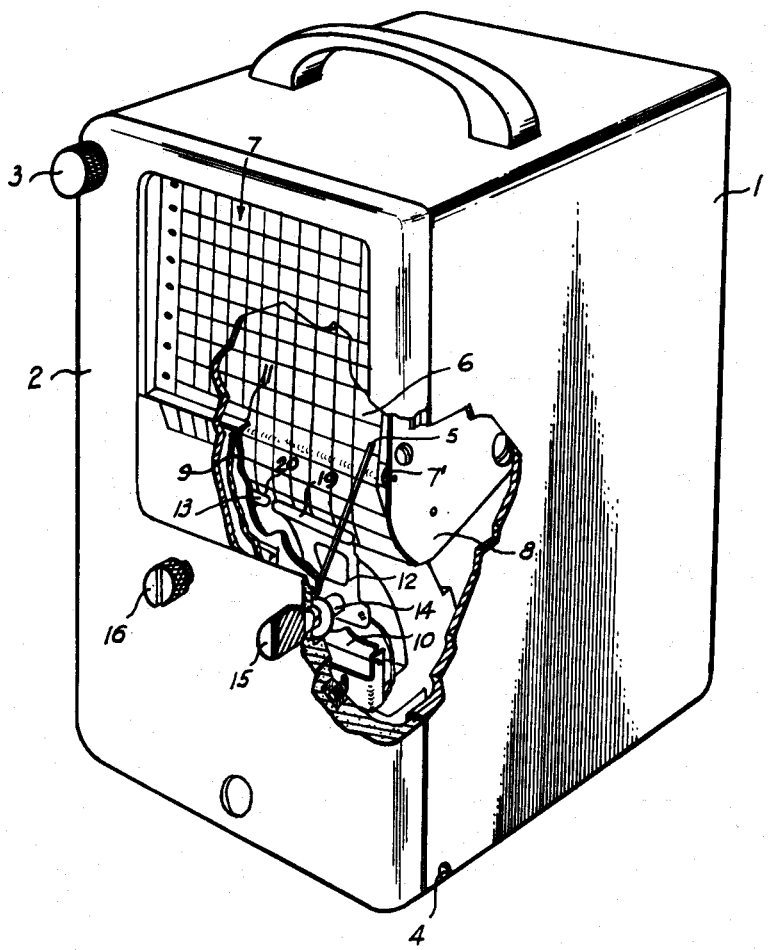

Feb. 23, 1965  S. PINCUS  3,170,754
ADJUSTMENT OF RECORDING DEVICES
Filed Jan. 29, 1962  2 Sheets-Sheet 1

INVENTOR.
SEYMOUR PINCUS
BY
ATTORNEY

United States Patent Office 3,170,754
Patented Feb. 23, 1965

3,170,754
ADJUSTMENT OF RECORDING DEVICES
Seymour Pincus, Manchester, N.H., assignor to Rustrak Instrument Co., Inc., Manchester, N.H., a corporation of New Hampshire
Filed Jan. 29, 1962, Ser. No. 169,329
6 Claims. (Cl. 346—25)

This invention relates to the adjustment of recording devices and more specifically to the adjustment of the control position of a galvanometer pointer or stylus moving across a graduated chart, in which the stylus is used to control and record simultaneously some function of voltage or current.

The invention is an improvement of U.S. patent application Serial No. 785,709, Method and Apparatus for Chart Recording, filed on January 8, 1959, by Richard W. May and assigned to the same assignee as the present application, now Patent No. 3,048,848, and U.S. patent application Serial No. 167,522, Improvements in or Relating to Recording Devices, filed on January 22, 1962, by Samuel K. Lackoff and also assigned to the same assignee as the present patent application.

One of the objects of the invention is to adjust the function control range of the galvanometric pointer and to actuate, under control of such adjustment, other operations such as relays effecting auxiliary operations such as the position of mechanical or electromechanical elements.

Another object of the invention is to actuate, under control of the position of the pointer, and depending upon the operational range of the pointer, other devices such as measuring gauges permitting selection of products conforming to predetermined tolerance ranges.

Still another object of the invention is to provide across a recording chart, and in the space between the pointer and the chart, one or several range control elements which are adjustable, and which under control of the position of the pointer conductively engage the pointer and permit production and passage of a current depending upon the relative position of pointer and conducting element, and thereby energization of relay means which are to be operated depending upon that relative position, which in turn may correspond to a predetermined recording range.

A more specific object of the invention is to provide in the space between a galvanometrically controlled pointer and a pressure sensitive chart, in a plane substantially parallel to the chart, one or several flat conducting elements arranged in juxta-position in that plane and arranged to represent several parallel ranges on the recording chart, and to adjust the position of these conducting elements in such a manner so as to permit adjustment of the ranges by adjusting the corresponding contact positions between pointer and conducting elements.

As a further object of the invention the galvanometric pointer is pressed by a percussion plate or striker bar to effect recording on a pressure-sensitive surface of a chart, and during this pressure movement it is permitted, depending upon the position of one or several conducting elements, to effect energization of a relay means within predetermined recording ranges.

Figure 2:
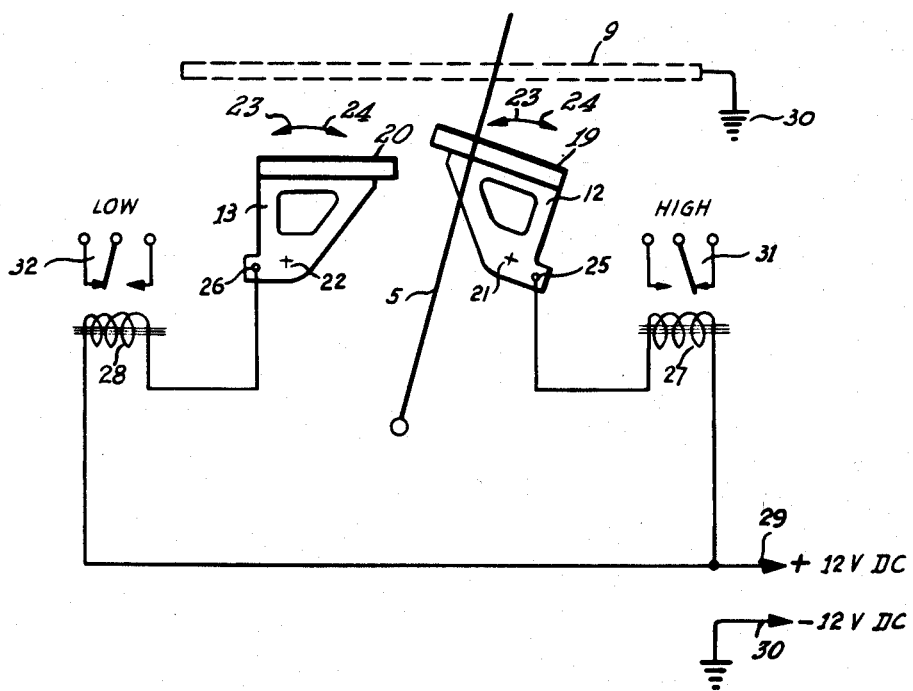

These and other objects of the invention will be more fully apparent from the drawings annexed herein in which FIG. 1 shows a recording device embodying certain principles of the invention in a perspective view, with range control elements being shown in a corresponding cut out of the housing of the recording device; and FIG. 2 shows a schematical layout of the control elements connected in a circuit diagram exemplifying a practical application.

In FIG. 1 the invention is shown to be applied to an electric recording device in which a pointer or needle, controlled by a galvanometer, is pressed against a pressure-sensitive chart and thereby produces point-shaped marks showing the electrical values to be recorded.

As apparent from FIG. 1 the recorder consists of a housing 1 provided with a door or panel 2 which can be opened by the releasing of a screw 3 whereupon panel 2 can be turned down around axis 4 thereby exposing a number of recording elements which are substantially supported on the back of panel 2.

As apparent from the cut-out of FIG. 1 the galvanometrically controlled pointer is shown at 5 while a pressure-sensitive chart 6 is shown to be supported on a bracket structure 8 in a position facing a window 7 of panel 2 in a substantially parallel plane.

As also apparent from FIG. 1 chart 6 is guided over a relatively small diameter roller 7' before entering the straight path facing window 7, extending across chart 6, only part of which is shown in the perspective view of FIG. 1.

Roller 7' is arranged in a pair of side brackets one of which is shown at 8; it forms the backing for the movement of a percussion plate or striker bar schematically indicated at 9. Plate 9 has a lower edge 10 forming a rotating axis and an upper or working edge 11 which under the control of this rotation presses pointer 5 together with pressure-sensitive paper chart 6 against backing roller 7'.

In this way, also described in the above-mentioned co-pending applications, under control of the rocking movement of percussion plate 9, a series of visible marks are impressed on chart paper 6 at the inter-section or tangential contact line of pointer 5 with backing roller 7'.

In accordance with the invention a pair of control elements are shown to be arranged in the form of plates arranged in a plane substantially parallel to panel 2 and chart paper 6, but arranged in the space between pointer 5 and chart paper 6. Of these control plates only control plate 12 is shown in FIG. 1 in some detail while another plate arranged in the same plane as control plate 12 is only partially shown at 13.

Both control plates 12 and 13 are arranged on shafts of which only one, 14, is shown, rotatable from the outside by means of knobs 15, 16, respectively.

Control plates 12, 13 are conducting, or have at least conducting parts, and working edges schematically indicated at 19, 20 which permit current to pass from working edges 19, 20 through pointer 5 and working edge 11 of percussion plate 9.

In this way, as long as pointer 5 will move over the ranges represented by the positions of control plates 12, 13, at the movement of percussion plate 9 effecting marking of chart paper 6, a current will be permitted to pass from percussion plate 9 through pointer 5 and will be available to effect any desired relay or servo operation, within the operating ranges represented by the angular positions of control plates 12, 13.

By rotating buttons 15 or 16 in one or the other direction, the range of these relay operations can be enlarged or reduced, or adjusted in position as desired, depending whether or not elements 12 or 13 are in or out of contact with pointer 5.

If desired, control elements 12, 13 can be adjusted radially in such a manner as to remain continuously out of contact with said pointer and thereby substantially ineffective.

The invention is not limited to the particular shape or the material of the control elements 12, 13 nor to their number, but may be applied in any other appropriate manner without departing from the scope of this disclosure.

A physical layout of the control elements in connection with a circuit diagram is shown in FIG. 2 where the control elements are again schematically indicated at 12, 13 and rotatable over axes 21, 22, respectively, in the direction of arrows 23, 24. Control elements 12, 13 are shown to consist of conducting material and connected over terminals 25, 26, respectively, to separate relay coils schematically shown at 27, 28.

The other terminals of relays 27, 28 are connected to a source of electric power such as a 12-volt battery the plus terminal of which is schematically indicated at 29.

The minus or ground terminal of this battery is schematically indicated at 30 and connected to percussion plate 9 only schematically indicated in FIG. 2.

Relay coils 27, 28 are controlled, for example, by certain high and low ranges of the recording devices, respectively, determined by the position of control elements 12, 13, to operate contacts schematically indicated at 31, 32, respectively, which in turn may energize or operate valves, motors, or mechanical or electro-mechanical sorting devices which are to be operated (or not operated) while galvanometric pointer 5 passes through (or is outside of) the recording ranges determined by the rotary position of control elements 12, 13.

It should also be noted that the invention is not limited to the particular circuits or circuit elements shown or described nor to the specific circuit connections used in the example illustrated here, but may be applied in any appropriate manner without departing from the scope of this invention.

I claim:

1. In a recording device, a pressure sensitive chart, a panel in front of said chart having an opening forming a window for at least part of said chart, means for driving said chart, conductive percussion means arranged facing said chart, a galvanometrically controlled stylus supported on the back of said panel and movable across said window in a plane extending between said percussion means and said chart, and also arranged to be movable by said percussion means in a direction perpendicular to said plane to contact said chart at an intersection between said percussion means and said stylus, thereby producing on said chart a recording mark corresponding to the instantaneous position of said stylus with respect to said percussion means, at least one control element consisting of a substantially triangular plate mounted rotatably on a corner thereof and having a contact edge formed on the base facing said corner; said contact edge engaging the latter when said stylus is engaged by said percussion means, said control element being supported together with said percussion means on said panel back, and arranged in the space between stylus and said chart, and movable from the front of said panel in a plane substantially parallel to that of said stylus movement so as to cause said percussion means when engaging said stylus to simultaneously engage said control element and relay means coupled to said percussion means, and to operate said control element by the simultaneous engagement of said stylus and said percussion means.

2. In a recording device, the combination according to claim 1, wherein said control element, said stylus and said percussion means when engaging each other form an electrically conducting path.

3. In a recording device, the combination according to claim 1, wherein said control elements is arranged rotatably about an axis substantially perpendicular to said plane of its movement, said contact edge determining the range during which said conducting path is effective.

4. In a recording device, the combination according to claim 1, further comprising several control elements arranged juxtaposed facing parallel portions of said chart, said control elements being adjustable substantially independently from each other to produce several independently adjustable ranges of contact between said stylus and said percussion means, and separate relay means controlled by the engagement of said stylus, said control elements and said percussion means at predetermined but different ranges of stylus positions.

5. In a recording device, the combination according to claim 1, wherein said control element is radially adjustable from the front of said recording device to produce differently located ranges in which said relay means is operable by said position of the stylus.

6. In a recording device, the combination according to claim 5, wherein said control element is radially adjustable so as to remain continuously out of contact with said stylus and thereby ineffective.

References Cited in the file of this patent

UNITED STATES PATENTS

| 1,446,961 | Brown | Feb. 27, 1923 |
|---|---|---|
| 1,873,983 | Sieber | Aug. 30, 1932 |
| 2,198,902 | Caldwell | Apr. 30, 1940 |
| 2,784,266 | Krahulec | Mar. 5, 1957 |
| 3,048,848 | May | Aug. 7, 1962 |